United States Patent
Zhang et al.

(10) Patent No.: US 12,218,835 B2
(45) Date of Patent: Feb. 4, 2025

(54) BITMASK ROUTE TARGET IN TARGETED DISTRIBUTION OF INFORMATION USING A ROUTING PROTOCOL

(71) Applicant: Juniper Networks, Inc., Sunnyvale, CA (US)

(72) Inventors: Zhaohui Zhang, Westford, MA (US); Jeffrey Haas, Ypsilanti, MI (US); Srihari Ramachandra Sangli, Bengaluru (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 263 days.

(21) Appl. No.: 17/090,621

(22) Filed: Nov. 5, 2020

(65) Prior Publication Data
US 2021/0367883 A1   Nov. 25, 2021

(30) Foreign Application Priority Data
May 22, 2020 (IN) .............................. 202041021640

(51) Int. Cl.
*H04L 45/02* (2022.01)
*H04L 12/46* (2006.01)
(Continued)

(52) U.S. Cl.
CPC .......... *H04L 45/64* (2013.01); *H04L 12/4641* (2013.01); *H04L 41/0893* (2013.01);
(Continued)

(58) Field of Classification Search
CPC ..... H04L 45/64; H04L 45/03; H04L 12/4641; H04L 45/02; H04L 41/0893
See application file for complete search history.

(56) References Cited

U.S. PATENT DOCUMENTS 7,319,700 B1 *  1/2008  Kompella ............... H04L 45/02
                                                              370/227
8,484,353 B1    7/2013  Johnson et al.
(Continued)

FOREIGN PATENT DOCUMENTS

CN      101142791 A    3/2008
CN      104412551 A    3/2015
(Continued)

OTHER PUBLICATIONS

Office Action dated Dec. 24, 2020 from U.S. Appl. No. 16/395,656, 16 pp.
(Continued)

*Primary Examiner* — Ario Etienne
*Assistant Examiner* — Kidest Mendaye
(74) *Attorney, Agent, or Firm* — Shumaker & Sieffert, P.A.

(57) ABSTRACT

Techniques are described by which a routing protocol, such as border gateway protocol (BGP), is extended to control propagation and importation of information using route targets (RTs) specified as bitmasks that encode link administrative group information. For example, a network control device (e.g., controller) is configured to allocate one or more subset of resources (e.g., nodes or links) of an underlay network to each of one or more virtual networks established over the underlay network. The controller generates a bitmask encoded with link administrative group information of the one or more links. The controller then outputs, to a plurality of provider edge (PE) routers that are participating in a respective virtual network, a routing protocol message to advertise the one or more subset of resources, wherein the routing protocol message includes a route target specified as the bitmask.

17 Claims, 5 Drawing Sheets

(51) Int. Cl.
    *H04L 41/0893*    (2022.01)
    *H04L 41/12*      (2022.01)
    *H04L 45/03*      (2022.01)
    *H04L 45/64*      (2022.01)
(52) U.S. Cl.
    CPC .............. *H04L 41/12* (2013.01); *H04L 45/02* (2013.01); *H04L 45/03* (2022.05)

(56) References Cited

U.S. PATENT DOCUMENTS

| | | | |
|---|---|---|---|
| 8,774,047 | B2 | 7/2014 | Kulmala et al. |
| 9,064,216 | B2 | 6/2015 | Reddy et al. |
| 9,106,530 | B1 | 8/2015 | Wang |
| 9,794,165 | B1 | 10/2017 | Wood |
| 9,806,985 | B2 * | 10/2017 | Fang ................. H04L 45/04 |
| 9,898,317 | B2 | 2/2018 | Nakil et al. |
| 10,389,635 | B2 | 8/2019 | Jeganathan et al. |
| 10,637,768 | B1 | 5/2020 | Joseph et al. |
| 10,708,125 | B1 | 7/2020 | Chen |
| 10,848,423 | B1 | 11/2020 | Chen et al. |
| 11,082,337 | B2 | 8/2021 | Drake |
| 2005/0094567 | A1 | 5/2005 | Kannan et al. |
| 2005/0213513 | A1 | 9/2005 | Ngo et al. |
| 2007/0260746 | A1 | 11/2007 | Mirtorabi et al. |
| 2010/0043068 | A1 | 2/2010 | Varadhan et al. |
| 2011/0142053 | A1 | 6/2011 | Van Der Merwe et al. |
| 2012/0300615 | A1 | 11/2012 | Kempf et al. |
| 2014/0244847 | A1 | 8/2014 | Pouyllau et al. |
| 2014/0301192 | A1 | 10/2014 | Lee et al. |
| 2015/0195178 | A1 * | 7/2015 | Bhattacharya ...... H04L 41/0895 718/1 |
| 2015/0249587 | A1 * | 9/2015 | Kozat ................. H04L 43/20 370/236 |
| 2015/0381493 | A1 | 12/2015 | Bansal et al. |
| 2016/0087890 | A1 | 3/2016 | Przygienda et al. |
| 2016/0127142 | A1 | 5/2016 | Tian et al. |
| 2017/0012865 | A1 | 1/2017 | Nainar et al. |
| 2017/0289027 | A1 | 10/2017 | Ratnasingham |
| 2017/0353394 | A1 * | 12/2017 | Brandwine ........... G06F 9/5077 |
| 2018/0367456 | A1 | 12/2018 | Wijnands et al. |
| 2020/0322264 | A1 * | 10/2020 | Clad ................. H04L 45/34 |
| 2021/0083940 | A1 | 3/2021 | Peng et al. |

FOREIGN PATENT DOCUMENTS

| | | | |
|---|---|---|---|
| CN | 104780096 | A | 7/2015 |
| CN | 108989203 | A | 12/2018 |
| CN | 110944357 | A | 3/2020 |
| WO | 2014186225 | A1 | 11/2014 |
| WO | 2022194023 | * | 9/2022 ............. H04L 45/70 |

OTHER PUBLICATIONS

Response to the Office Action dated Dec. 24, 2020 from U.S. Appl. No. 16/395,656, filed Mar. 24, 2021, 12 pp.
Sangli et al. "BGP Extended Communities Attribute" Network Working Group, RFC 4360, Feb. 2006, 12 pp.
P. Marques et al., "Constrained Route Distribution for Border Gateway Protocol/MultiProtocol Label Switching (BGP/MPLS) Internet Protocol (IP) Virtual Private Networks (VPNs)," Network Working Group, RFC 4684, Nov. 2006, 15 pp.
Gredler et al., "North-Bound Distribution of Link-State and Traffic Engineering (TE) Information Using BGP," RFC 7752, Internet Engineering Task Force (IETF), Mar. 2016, 48 pp.
U.S. Appl. No. 16/395,656 entitled "Support for Multiple Virtual Networks Over an Underlay Network Topology", Juniper Networks, Inc. (inventor: Drake) filed Apr. 26, 2019.
Filsfils et al., "Segment Routing Architecture," Internet Engineering Task Force (IETF), RFC 8402, Jul. 2018, 33 pp.
Filsfils et al., "Segment Routing Use Cases" Network Working Group, draft-filsfils-rtgwg-segment-routing-use-cases-01, Internet-Draft, Jul. 14, 2013, 46 pp.
Filsfils et al., "Segment Routing Architecture," Network Working Group, draft-filsfils-spring-segment-routing-04, Jul. 3, 2014, 18 pp.
Previdi et al., "Source Packet Routing in Networking (SPRING) Problem Statement and Requirements," RFC 7855, Internet Engineering Task Force, IETF, May 2016, 19 pp.
Filsfils et al., "Segment Routing with MPLS data plane" draft-filsfils-spring-segment-routing-mpls-03, Internet-Draft, Network Working Group, Jul. 31, 2014, 14 pp.
Mohapatra et al. "The BGP Encapsulation Subsequent Address Family Identifier (SAFI) and the BGP Tunnel Encapsulation Attribute" Network Working Group, RFC 5512, Apr. 2009, 13 pp.
Psenak et al. "IGP Flexible Algorithm" Network Working Group, draft-ietf-lsr-flex-algo-07.txt, Internet-Draft, Apr. 1, 2020, 34 pp.
Raszuk et al. "Registered Wide BGP Community Values" IDR Working Group, draft-ietf-idr-registered-wide-bgp-communities-02, Internet-Draft, May 31, 2016, 18 pp.
Extended Search Report from counterpart European Application No. 21175190.4 dated Oct. 26, 2021, 10 pp.
Talaulikar P Psenak Cisco Systems S Zandi G Dawra Linkedin K: "Flexible Algorithm Definition Advertisement with BGP LinkState; draft-ietf-idr-bgp-ls-flex-algo-02.txt",No. 2, Jan. 6, 2020, pp. 1-13, XP015137151.
Response to Extended Search Report dated Oct. 26, 2021, from counterpart European Application No. 21175190.4 filed May 20, 2022, 41 pp.
Notice of Allowance from U.S. Appl. No. 16/395,656, mailed May 28, 2021, 11 pp.
U.S. Appl. No. 17/391,798, filed Aug. 2, 2021, naming inventor Drake.
Response to Office Action dated Dec. 5, 2022 from U.S. Appl. No. 17/391,798, filed Dec. 12, 2022, 9 pp.
Eastlake et al., "BGP Dissemination of Flow Specification Rules for Tunneled Traffic draft-ietf-idr-flowspec-nvo3-08", Internet-draft, Jan. 2020, 21 pp.
First Office Action and Search Report, and translation thereof, from counterpart Chinese Application No. 202110552797.6 dated Aug. 29, 2022, 15 pp.
Office Action from U.S. Appl. No. 17/391,798 dated Oct. 5, 2022, 16 pp.
Talaulikar et al., "BGP Link-State Extensions for BGP-only Fabric draft-ketant-idr-bgp-ls-bgp-only-fabric-05", Internet-Domain Routing Internet-Draft, Sep. 2020, 29 pp.
Chen et al., "Bitmask-based code compression methods for balancing power consumption and code size for hard real-time embedded systems", Department of Computer Science and Information Engineering, vol. 36, National Changhua University of Education, Changhua, Taiwan, Jan. 14, 2012, pp. 267-279.
Murthy et al., "Lossless Compression using Efficient Encoding of Bitmasks", Department of Computer and Information Science and Engineering, 2009 IEEE Computer Society Annual Symposium on VLS, University of Florida, Gainesville, FL, Dec. 31, 2009, pp. 1-6.
Liu et al., "Preliminary Study on the Construction and Application of Local Power Dispatch Data Network", Translation of Abstract Only, Tech Rich Wizard, Dec. 20, 2014, 3 pp.
Second Office Action from counterpart Chinese Application No. 202110552797.6 dated Mar. 4, 2023, 12 pp.
Notice of Allowance from U.S. Appl. No. 17/391,798 dated Feb. 9, 2023, 9 pp.
Notice of Intent to Grant and Text Intended to Grant from counterpart European Application No. 21175190.4 dated Apr. 2, 2024, 67 pp.

* cited by examiner

BITMASK ROUTE TARGET IN TARGETED DISTRIBUTION OF INFORMATION USING A ROUTING PROTOCOL

This application claims the benefit of Indian Provisional Patent Application No. 202041021640, filed May 22, 2020, the entire content of which is incorporated herein by reference.

TECHNICAL FIELD

The invention relates to computer networks and, for example, distribution of information, such as topology and/or routing algorithm information, using a routing protocol.

BACKGROUND

A wide variety of customer devices connect to service provider networks to access resources and services provided by packet-based data networks, such as the Internet, enterprise intranets, content providers, and virtual private networks (VPNs). Each service provider network typically provides an extensive network infrastructure to provide packet-based data services to the customer devices. The service provider networks may comprise a wide area network (WAN). In some examples, each service provider network may comprise a single autonomous system (AS) within a WAN that includes multiple ASes. In other examples, each service provider network may comprise two or more ASes within the WAN.

The network infrastructure of a service provider network typically includes a vast collection of access nodes, aggregation nodes and high-speed edge routers interconnected by communication links. These network devices typically execute various protocols and exchange signaling messages to anchor and manage subscriber sessions and communication flows associated with customer devices. A controller, e.g., software defined network (SDN) controller, may be included in the network architecture to provide centralized control of the subscriber sessions and communication flows within the service provider network. In some cases, a controller may provide centralized control over an entire WAN including multiple ASes.

SUMMARY

In general, techniques are described by which a routing protocol, such as border gateway protocol (BGP), is extended to control propagation and importation of information using route targets (RTs) specified as bitmasks that encode link administrative group information. For example, a network control device (referred to herein as "controller"), e.g., SDN controller, that manages the subscriber sessions and communication flows within a service provider network may be configured to allocate one or more subset of resources (e.g., nodes and links) of an underlay network to each of one or more virtual networks established over the underlay network. The subset of resources can be used to direct traffic of a given network slice, virtual private network (VPN), or set of VPNs to best deliver end-to-end services. In some examples, the controller outputs a routing protocol message, e.g., border gateway protocol—link state (BGP-LS), to advertise the subset of resources. In accordance with the disclosed techniques, the controller generates a bitmask encoded with link administrative group information (e.g., colors or other link affinities) associated with the links and attaches, to the BGP-LS advertisement, a route target specified as the bitmask to control the importation of the advertisement. Each bit of the bitmask corresponds to a different administrative group assigned to a link or set of links within a network. The route target specified as a bitmask is referred to herein as "bitmask route target."

Based on the advertisements (e.g., routing protocol message), each of the PE routers determines whether to import the advertisements based on the bitmask route target specified within the advertisements. For example, each router that is to import the advertisement is configured with one or more corresponding bitmask route targets. In response to receiving an advertisement, the router performs, for example, a logical 'AND' operation with the bitmask route target attached to the advertisement and the one or more bitmask route target(s) configured on the router. In response to determining that the result of the logical 'AND' operation is a non-zero value, the router imports the information carried by the routing protocol advertisement, such as topology information and/or algorithm information. In response to determining that the result of the logical 'AND' operation is zero, the router does not import the advertisement.

The techniques described in this disclosure may provide one or more technical advantages that realize a practical application. For example, instead of the controller having to send a respective advertisement carrying topology or algorithm information for each link administrative group defined within the network, the controller may send an advertisement having topology/algorithm information for a plurality of the link administrative groups (e.g., a subset or even all of the link administrative groups) with each of the administrative link groups to which the advertisement is directed being represented by a different one of the bits in the bitmask route target. In this way, the bitmask route target can be used to selectively identify any of the administrative link groups to control route propagation and importation by the individual routers, which reduces the number of advertisements required to be sent to the routers.

In one example, this disclosure is directed to a network control device comprising a network interface, and a control unit comprising at least one processor. The control unit of the controller device is configured to allocate one or more subset of resources of an underlay network to each of one or more virtual networks established over the underlay network, wherein the one or more subset of resources allocated to a respective virtual network includes one or more nodes and one or more links of the underlay network to be used by the respective virtual network; generate a bitmask encoded with link administrative group information associated with the one or more links, wherein each bit of the bitmask corresponds to a different one of a plurality of link administrative groups defined on the network control device, and wherein each of the link administrative groups define a different grouping of the one or more subset of resources of the underlay network; and output, to a plurality of provider edge (PE) routers that are participating in a respective virtual network, a routing protocol message to advertise the one or more subset of resources, wherein the routing protocol message includes a route target specified as the bitmask.

In another example, this disclosure is directed to a router comprising a plurality of network interfaces, and a control unit comprising at least one processor. The control unit of the router is configured to receive a routing protocol message that has an attached route target specified as a bitmask; and determine, based on the bitmask, whether to import the information carried by the routing protocol message.

In a further example, this disclosure is directed to a method comprising allocating, by a network control device, one or more subset of resources of an underlay network to each of one or more virtual networks established over the underlay network, wherein the one or more subset of resources allocated to a respective virtual network includes one or more nodes and one or more links of the underlay network to be used by the respective virtual network; generating, by the network control device, a bitmask encoded with link administrative group information of the one or more links, wherein each bit of the bitmask corresponds to a different one of a plurality of link administrative groups defined on the network control device, and wherein each of the link administrative groups define a different grouping of the one or more subset of resources of the underlay network; and outputting, by the controller and to a plurality of provider edge (PE) routers that are participating in a respective virtual network, a routing protocol message to advertise the one or more subset of resources, wherein the routing protocol message includes a route target specified as the bitmask.

The details of one or more examples are set forth in the accompanying drawings and the description below. Other features, objects, and advantages will be apparent from the description and drawings, and from the claims.

DETAILED DESCRIPTION

Figure 1:
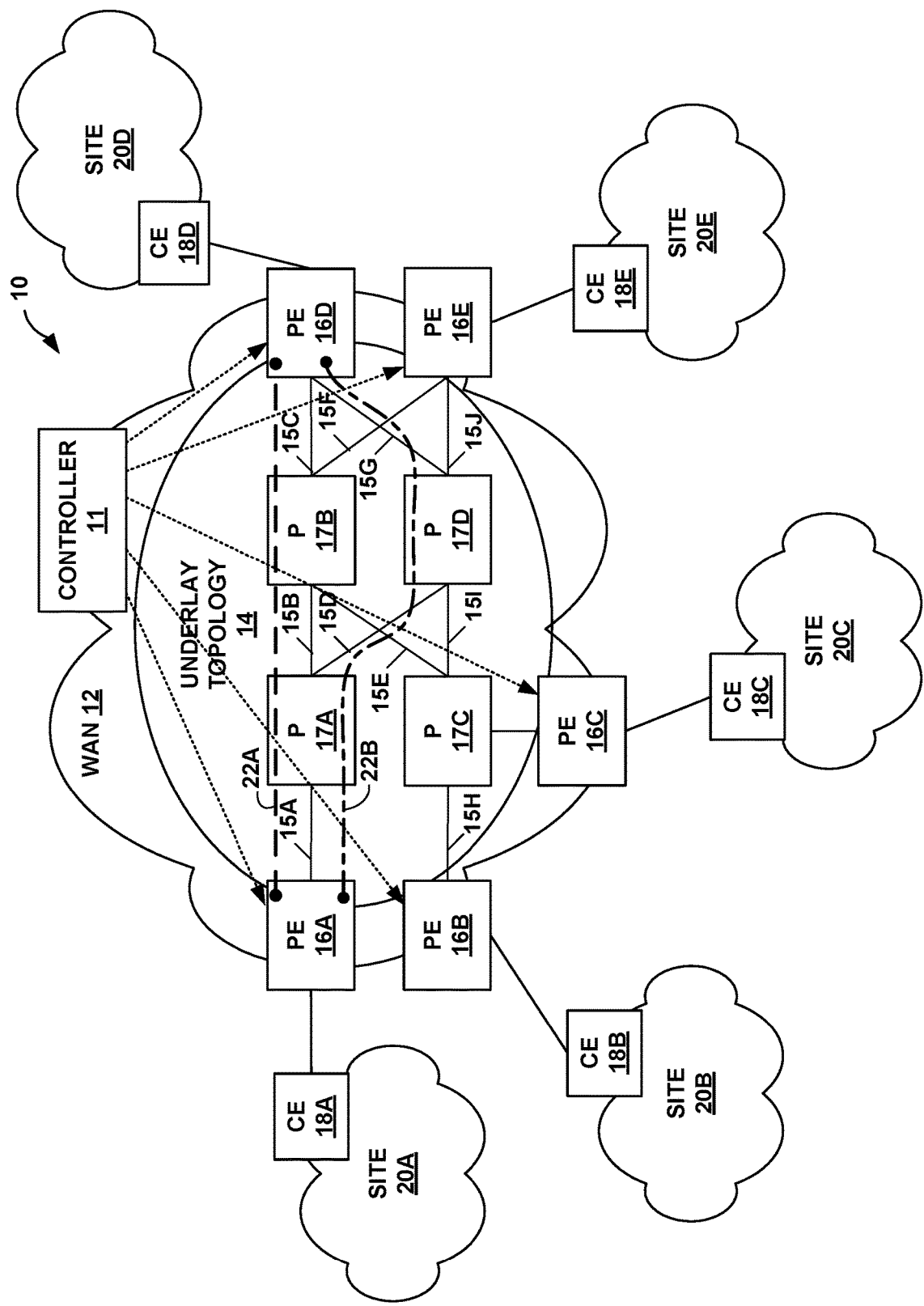
FIG. 1 is a block diagram illustrating an example network for providing propagation and importation of border gateway protocol routing information using route targets specified as bitmasks encoded with link administrative group information, in accordance with the techniques of this disclosure.

FIG. 1 is a block diagram illustrating an example network for providing propagation and importation of border gateway protocol (BGP) routing information (e.g., routes, link/node information, routing algorithm information, and the like) using route targets (RTs) specified as bitmasks encoded with link administrative group information, in accordance with the techniques of this disclosure.

As illustrated in FIG. 1, network system 10 includes a wide area network (WAN) 12 having underlay network topology 14 ("underlay topology 14") and a plurality of remote sites 20A-20E ("sites 20") connected to WAN 12. In some examples, WAN 12 may support one or more virtual networks on top of underlay topology 14 in order to connect one or more of sites 20 across WAN 12. For example, virtual networks may enable sites 20 to securely share data over WAN 12. Virtual networks may comprise virtual private network (VPNs) or network slices configured with different performance and scaling properties.

WAN 12 may comprise the Internet or another public network. In some cases, WAN 12 may comprise a multi-protocol label switching (MPLS) network. In some cases, WAN 12 may comprise a mobile communication network, such as a 5G mobile network. WAN 12 has underlay topology 14, which may comprise an Internet Protocol (IP) fabric of nodes and links. Although illustrated in FIG. 1 as a single topology, in one example underlay topology 14 of WAN 12 may comprise two or more autonomous systems (ASes). In this example, WAN 12 and the disclosed techniques support inter-AS connectivity. Each AS may comprise a collection of network devices under the control of a network service provider that offers services to customers at sites 20 that access WAN 12. Services offered may include, for example, traditional Internet access, VoIP, video and multimedia services, and security services. Further example details of inter-AS connectivity in a WAN are described in U.S. patent application Ser. No. 15/084,769, filed Mar. 30, 2016, the entire contents of which are incorporated herein by reference.

Each of sites 20 may include a local area network (LAN) or a wide area network (WAN) that comprises a plurality of subscriber devices, such as desktop computers, laptops, workstations, PDAs, wireless devices, network-ready appliances, file servers, print servers or other devices. In some examples, at least one of sites 20 may comprise a data center site having specialized facilities that provide storage, management, and dissemination of data to subscribers and other entities. A data center site may include, for example, a plurality of servers and storage area networks (SANs) that provide computing environments for subscribers/customers. Subscriber devices may connect to the data center site to request and receive services and data provided by the data center site.

In the illustrated example of FIG. 1, WAN 12 includes a controller device 11, provider edge (PE) routers 16A-16E ("PE routers 16"), and transit routers, e.g., provider (P) routers 17A-17D. Controller 11 of WAN 12 may comprise a software defined network (SDN) controller that provides centralized control of customer sessions and communication flows within WAN 12. In some examples, controller 11 is configured to allocate one or more subset of resources of underlay topology 14 to a respective virtual network. The subset of resources allocated to a virtual network includes, for example, one or more nodes and one or more links of underlay network 14 to be used by the virtual network. The subset of resources can be used to direct traffic of a given virtual network (e.g., network slice, VPN, or set of VPNs) to best deliver end-to-end services. In some examples, the subset of resources allocated to the virtual network may be a dedicated subset of resources that are only used to forward traffic of the virtual network. In other examples, the subset of resources allocated to the virtual network may be at least partially shared and used to forward traffic of multiple virtual networks. Controller 11, therefore, may configure and manage the routing and switching infrastructure within WAN 12 (e.g., including PE routers 16 and P routers 17). Further example details of an SDN controller are described in U.S. Pat. No. 9,898,317, issued Feb. 20, 2018, and U.S. Pat. No. 9,794,165, issued Oct. 17, 2017, the entire contents of each of which are incorporated herein by reference.

Each of PE routers 16 couples to one or more of remote sites 20 via customer edge (CE) routers 18A-18E ("CE routers 18"), respectively. For example, PE router 16A is coupled to site 20A via CE router 18A, PE router 16B is coupled to site 20B via CE router 18B, PE router 16C is coupled to site 20C via CE router 18C, PE router 16D is coupled to site 20D via CE router 18D, and PE router 16E is coupled to site 20E via CE router 18E. PE devices 16 are connected to P routers 17 via links 15A-15J (collectively, "links 15"), e.g., Ethernet links.

PE routers 16 may compute one or more paths for virtual networks established over underlay topology 14. As one example, PE routers 16 may use segment routing techniques, e.g., a Source Packet and Routing Networking (SPRING) paradigm, to advertise network segments between nodes using interior gateway protocols (IGPs) or to controller 11 using border gateway protocol—link state (BGP-LS) and build single or multi-hop tunnels within an IGP domain, e.g., WAN 12. In segment routing, the "path" information for segments is disseminated between the routers within an IGP domain (or between the routers and controller 11 using BGP-LS) as part of the IGP link state information for the respective domain. An ingress router is able to steer a packet through an ordered list of instructions or segments by prepending one or more segment identifiers (SIDs) to the packet. In other words, an ingress router can steer a packet through a desired set of nodes and links by prepending the packet with an appropriate combination (stack) of SIDs. Segment routing allows routers to enforce a flow through any topological path and service chain while maintaining per-flow state only at the ingress node to each domain.

Segment routing is further described in Filsfils et. al., "Segment Routing Architecture," Internet Engineering Task Force (IETF), Request for Comments (RFC 8402), July 2018, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 201; and (3) "Segment Routing with MPLS data plane," IETF draft: draft-filsfils-spring-segment-routing-mpls-03, Aug. 1, 2014, the entire contents of each of which are incorporated by reference herein.

In some examples, PE routers 16 may implement flexible algorithm techniques to compute constraint-based paths based on different algorithms. The algorithms may define, for example, calculation types, metric types, and/or constraints used to compute paths. For example, calculation types may include IGP algorithms defined under "Interior Gateway Protocol (IGP) Parameters" IANA registries or other calculation mechanisms. Metric types may include the type of metrics used to compute the best paths along a constrained topology, such as an IGP metric, minimum unidirectional link delay, traffic engineering default metric, etc. The constraints may, for example, restrict paths to links with specific affinities or avoid links with specific affinities. A type of constraint may be to compute a path along a subset links associated with a particular color. Color is a generic notion which may represent any characteristic or property of the network, such as virtual topology, network slice, path computation algorithm, traffic engineering constraint (e.g., latency, bandwidth, etc.), administrative profile, etc. In the example of FIG. 1, links 15A, 15B, and 15C may be associated with a first color (e.g., "red") that represents links with a first link attribute (e.g., low latency) and may be used to compute constraint-based path 22A from PE router 16A to PE router 16D. Similarly, links 15A, 15D, and 15G may be associated with a second color (e.g., "blue" color) that represents links with a second link attribute (e.g., high bandwidth) and may be used to compute constraint-based path 22B from PE router 16A to PE router 16D. Additional examples of color constraints are described in P. Mohapatra et al., "The BGP Encapsulation Subsequent Address Family Identifier (SAFI) and the BGP Tunnel Encapsulation Attribute," Internet Engineering Task Force (IETF) RFC 5512, April 2009, the entire content of which is incorporated by reference herein. Further examples of flexible-algorithm are described in P. Psenak, Ed., et al., "IGP Flexible Algorithm," Internet-Draft, draft-ietf-lsr-flex-algo-07.txt, Apr. 1, 2020, the entire content of which is incorporated by reference herein.

In some current example solutions, an administrator may assign one or more administrative groups (e.g., colors) to links of each router (e.g., via a command-line interface of the router). After the links have been configured, routers typically use IGP to flood the IGP domain with a flexible-algorithm definition that includes the combination of (a) calculation-type, (b) metric-type, and (c) constraints, and may be identified by a flexible-algorithm identifier. The flexible-algorithm definition may include the link administrative group information that identifies the link attribute (e.g., color). However, in these examples, each of the routers send and receive flexible algorithm definitions and link administrative group information throughout an IGP domain and every router may compute a path for each algorithm, which is inherently unscalable (e.g., when there is a larger number of algorithms).

To address scalability issues, a network may, in some examples, include a controller to allocate one or more subset of resources of underlay topology 14 to PE routers 16 participating in a respective virtual network. For example, the controller may use BGP-LS to advertise the subset of resources (e.g., as a BGP-LS attribute attached to a link network layer reachability information (NLRI)) for the virtual network to PE routers participating in the virtual network. However, if a link belongs to different link administrative groups, then the controller typically advertises a respective BGP-LS advertisement for each link administrative group the link belongs to, which is also inherently unscalable (e.g., when a link has a larger number of assigned colors). Moreover, without the invention, BGP-LS does not support the advertisement of flexible-algorithm definitions.

In accordance with the techniques described in this disclosure, controller 11 and PE routers 16 provide propagation and importation of BGP-LS routes using route targets specified as bitmasks encoded with link administrative group information, in accordance with the techniques of this disclosure.

In the example of FIG. 1, controller 11 may configure link administrative groups for links of each router in WAN 12. As described above, links 15A, 15B, and 15C may be associated with a first color (e.g., "red") that represents links with a first link attribute (e.g., low latency) and may be used to compute constraint-based path 22A from PE router 16A to PE router 16D. Similarly, links 15A, 15D, and 15G may be associated with a second color (e.g., "blue" color) that represents links with a second link attribute (e.g., high bandwidth) and may be used to compute constraint-based path 22B from PE router 16A to PE router 16D. After allocating the links for the one or more virtual networks, controller 11 may generate a bitmask encoded with link administrative group information associated with the links. Each bit of the bitmask may correspond to a different administrative group assigned to a link or set of links within the network. In this example, controller 11 may set a first bit, e.g., the least significant bit, of the bitmask with a value of '1' which represents link 15A is assigned with a red color. Controller 11 may also set a second bit, e.g., the next bit from the least significant bit, of the bitmask with a value of '1' which represents link 15A is assigned with a blue color. The bitmask, in this example, is therefore set as '0011'. The example bitmask is merely an example and may be any variable length.

Controller 11 may then advertise the subset of resources (e.g., colored links) to PE routers 16 using a route target specified as the bitmask. For example, controller 11 may attach the route target specified as the bitmask to a BGP-LS advertisement (e.g., BGP update message). The route target specified as the bitmask may be referred to herein as "bitmask route target."

Each of PE routers 16 may then import or discard the advertisement (e.g., routing protocol messages) based on whether the respective PE router is participating in the virtual network, as indicated by the bitmask route target included in the advertisement. For example, PE router 16A, as an example, receives a routing protocol message that advertises the subset of resources of underlay network 14 allocated to the virtual network in which PE router 16A is participating. In order to import the advertisement for the virtual network, PE router 16A may perform a logical 'AND' operation with the bitmask route target attached to the routing protocol message and a bitmask route target configured on PE router 16A. Routers that need to learn the information are configured with one or more bitmask route targets, with the bits set for the link administrative groups that the routers want to import. The bitmask route target may be stored in an import route target list. As one example, PE router 16A may be configured with a route target specified as a bitmask of 0011, which may represent PE router 16A is to import routes for links associated with the colors red (e.g., first bit) and blue (e.g., second bit).

When PE router 16A receives a BGP-LS advertisement, PE router 16A may perform a logical 'AND' operation with the bitmask route target attached to the BGP-LS advertisement and the bitmask route target configured on PE router 16A, and if the result of the logical 'AND' operation is a non-zero value, PE router 16A imports the information carried by the routing protocol message, such as topology information and/or algorithm information. Alternatively, or additionally, if the result of the logical 'AND' operation is zero, PE router 16A does not import the information carried by the routing protocol message. As one example, controller 11 may send a bitmask route target as 0011 attached to a BGP-LS advertisement. In response to receiving the BGP-LS advertisement, PE router 16A performs a logical 'AND' operation with the bitmask route target attached to the BGP-LS advertisement (e.g., 0011) and the bitmask route target in its route target import list (e.g., 0011). In this example, PE router 16A determines that the result of the logical 'AND' operation results in a non-zero value and imports the information carried by the routing protocol message, such as topology information and/or algorithm information. Alternatively, or additionally, PE router 16A may import a BGP-LS advertisement with a bitmask route target of 0001 or a bitmask route target of 0010.

In some examples, controller 11 may also advertise a BGP-LS advertisement including a flexible algorithm definition (e.g., calculation type, metric type, included/excluded administrative group) defining the topology used for the algorithm. For example, BGP-LS comprises a new BGP Network Layer Reachability Information (NLRI) encoding format to specify the flexible algorithm definition. In this way, controller 11 may advertise a BGP-LS advertisement including NLRI specifying the flexible algorithm definition and is attached to a bitmask route target encoded with the link administrative group associated with the flexible algorithm definition.

In some examples, a bitmask route target may also be used for route target constraint mechanisms. Routers may use route target constraints to indicate interest in receiving only routes including particular route targets. Additional examples of route target constraint mechanisms are described in P. Marques, et al., "Constrained Route Distribution for Border Gateway Protocol/MultiProtocol Label Switching (BGP/MPLS) Internet Protocol (IP) Virtual Private Networks (VPNs), Request for Comments 4684, November 2006, the entire content of which is incorporated by reference herein. In accordance with the techniques of this disclosure, routers may send, for example, a BGP advertisement (e.g., BGP update message) including route target membership information identifying a respective bitmask route target that it is interested in receiving. For example, BGP peers (e.g., PE routers 16) may each send BGP advertisements including route target membership NLRI identifying a bitmask route target that it is interested in receiving. A BGP peer that receives the route target membership information may use the route target membership NLRI to control propagation of subsequent advertisements to each of the other PE routers 16 depending on whether the advertisements include a bitmask route target the other PE router is interested in. In this way, routers that implement bitmask route target for route target constraint mechanisms may restrict propagation of advertisements to only routers that have advertised interest in receiving advertisements including a particular bitmask route target, which may reduce the number of advertisements in the network.

Figure 2:
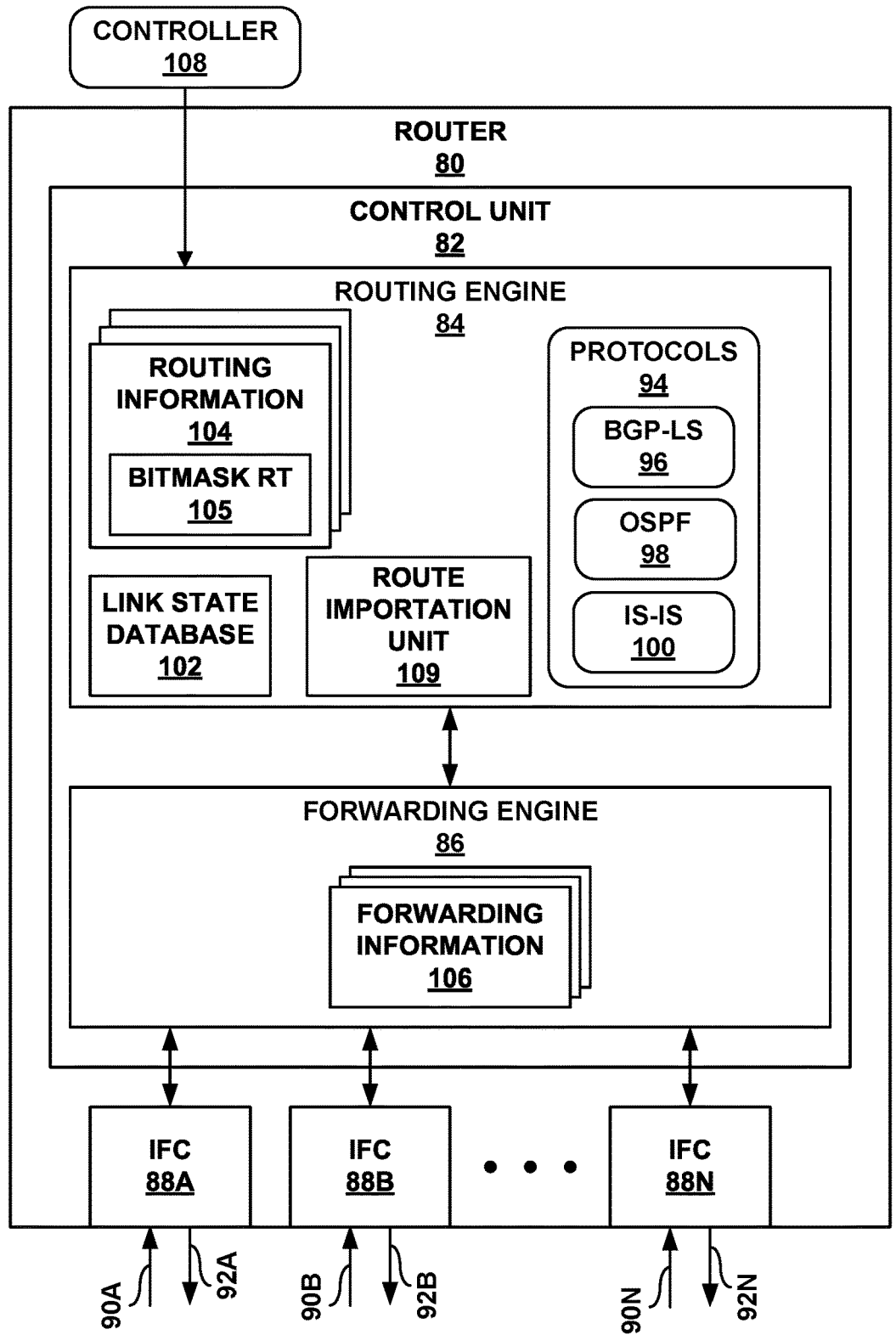
FIG. 2 is a block diagram illustrating an example router configured to provide importation of border gateway protocol routing information using route targets specified as bitmasks encoded with link administrative group information, in accordance with the techniques of this disclosure.

FIG. 2 is a block diagram illustrating an example router configured to provide importation of border gateway protocol routing information using route targets specified as bitmasks encoded with link administrative group information, in accordance with the techniques of this disclosure.

In general, router 80 may operate substantially similar to any of PE routers 16 of FIG. 1. In the illustrated example of FIG. 2, router 80 includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports (not shown in FIG. 2). Router 80 also includes a control unit 82 that determines routes of received packets and forwards the packets accordingly via IFCs 88.

Control unit 82 may comprise a routing engine 84 and a forwarding engine 86. Control unit 82 provides an operating environment for routing engine 84 and may be implemented solely in software, or hardware, or may be implemented as a combination of software, hardware or firmware. For example, control unit 82 may include one or more processors (not shown) which execute software instructions. In that example, routing engine 84 may include various software modules or daemons (e.g., one or more routing protocol processes, management processes, user interfaces, and the like), and control unit 82 may include a computer-readable storage medium, such as computer memory or hard disk, for storing executable instructions.

Routing engine 84 operates as the control plane for router 80 and includes an operating system that provides a multitasking operating environment for execution of a number of concurrent processes. Routing engine 84 may implement one or more protocols 94 to execute routing processes. For example, protocols 94 may include BGP-LS 96, OSPF 98, and IS-IS 100 for exchanging link state information with other routing devices in the computer network. Routing engine 84 uses the Interior Gateway Protocol (IGP) link state routing protocols, OSPF 98 and/or IS-IS 100, to exchange/routing information with other routing devices in the same IGP area or autonomous system (AS) in order to discover the topology of the IGP area or AS and update link state database (LSDB) 102. Although not illustrated in FIG. 2, routing engine 84 may also include a segment routing component to implement segment routing techniques, such as SPRING. Routing engine 84 maintains LSDB 102 configured to store link state information about nodes and links within the computer network in which router 80 resides, e.g., underlay topology 14 of WAN 12 from FIG. 1. For example, LSDB 102 may include one or more of local/remote internet protocol (IP) addresses, local/remote interface identifiers, link metrics and traffic engineering (TE) metrics, link bandwidth, reservable bandwidth, class of service (CoS) reservation state, preemption, or shared risk link groups (SRLG).

Routing engine 84 may use BGP-LS 96 to share link state information collected by the IGP link state routing protocols with external components, such as controller 108 (which may represent an example implementation of controller 11 of FIG. 1). BGP-LS is further described in H. Gredler, et al., "North-Bound Distribution of Link-State and Traffic Engineering (TE) Information using BGP," Internet Engineering Task Force (IETF) RFC 7752, March 2016, the entire content of which is incorporated by reference herein. In accordance with the techniques described in this disclosure, routing engine 84 may also use BGP-LS 96 to receive, from controller 108, one or more subset of resources allocated to a given virtual network in which router 80 is participating. BGP-LS 96 comprises a new BGP Network Layer Reachability Information (NLRI) encoding format. In BGP-LS 96, the MP_Reach_NLRI and MP_UNREACH_NLRI attributes are used to carry opaque information, including the subset of resources allocated to the given virtual network. For example, each link state NLRI describes either a node, a link, or a prefix. In some examples, the MP_Reach_NLRI and MP_UNREACH_NLRI attributes may also be used to carry route target membership NLRI information for route target constraint mechanisms.

Routing information 104 may describe various routes within the network and the appropriate next hops for each route, i.e., the neighboring routing devices along each of the routes. Routing engine 84 analyzes LSDB 102 to generate routing information 104 and install forwarding data structures into forwarding information 106 of forwarding engine 86. In accordance with the disclosed techniques, routing engine 84 may generate a separate one of routing information 104 and forwarding information 106 for each of the virtual networks in which router 80 participates. The separate routing and forwarding tables created for each of the virtual networks in which router 80 participates are called Virtual Routing and Forwarding (VRF) tables. In general, one of routing information 104 comprises a global routing table for the entire computer network in which router 80 resides, e.g., underlay topology 14 of WAN 12 from FIG. 1.

In accordance with the disclosed techniques, routing engine 84 include a route importation unit 109 that controls importation of BGP routes using route targets specified as bitmasks encoding link administrative group information. In this example, routing engine 84 is configured with a bitmask route target 105 stored in routing information 104. For example, an administrator may configure bitmask route target 105 via an interface (not shown in FIG. 1) of router 80 and store the bitmask route target 105 in an import route target list in routing information 104. As described in this disclosure, bitmask route target 105 may represent a bitmask encoded with link administrative group information, where each bit of the bitmask corresponds to a different administrative group assigned to a link or set of links within the network.

Route importation unit 109 is configured to determine whether to import an incoming advertisement (e.g., BGP-LS update message) based on the bitmask route target attached to the incoming advertisement. For example, when router 80 receives a BGP-LS advertisement from controller 108, route importation unit 109 may perform a logical 'AND' operation on the bitmask route target attached to the received BGP-LS update message and bitmask route target 105 configured on router 80. If the result of the logical 'AND' operation is a non-zero value, route importation unit 109 imports the information carried by the routing protocol advertisement, such as topology information and/or algorithm information, e.g., by storing the route into routing information 104. If the result of the logical 'AND' operation is zero, route importation unit 109 does not import the incoming route.

In some examples, the incoming BGP-LS advertisement includes a flexible algorithm definition. For example, BGP-LS 96 comprises a new BGP Network Layer Reachability Information (NLRI) encoding format to specify a flexible algorithm definition. For example, router 80 may in some instances receive, from controller 108, a BGP-LS advertisement including NLRI specifying the flexible algorithm definition and is attached to a bitmask route target encoded with the link administrative group associated with the flexible algorithm definition.

Based on the imported route, routing engine 84 is configured to annotate LSDB 102 to indicate which resources (e.g., colored links) of the underlay topology of the computer network are allocated for a given virtual network. As one example routing engine 84 may add flags or other indicators to LSDB 102 to mark the advertised subset of resources as usable for the given virtual network. Routing engine 84 essentially masks-off or ignores the remaining resources of the underlay topology of the computer network included in LSDB 102 when performing routing services for the given virtual network. In this way, routing engine 84 has a restricted view of the full underlay topology of the computer network and, thus, only uses the subset of resources in the restricted view to generate one of routing tables 104 and one of forwarding tables 106 for the given virtual network.

Forwarding engine 86 operates as the data plane for router 80 for forwarding network traffic. In some examples, forwarding engine 86 may comprise one or more packet forwarding engines (PFEs) (not shown) that may each comprise a central processing unit (CPU), memory and one or more programmable packet-forwarding application-specific integrated circuits (ASICs). Forwarding information 106 may associate, for example, network destinations with specific next hops and corresponding interface ports of IFCs 88. Forwarding information 106 may be a radix tree programmed into dedicated forwarding chips, a series of tables, a complex database, a link list, a radix tree, a database, a flat file, or various other data structures.

The architecture of router 80 illustrated in FIG. 2 is shown for exemplary purposes only. The techniques of this disclosure are not limited to this architecture. In other examples, router 80 may be configured in a variety of ways. In one example, some of the functionally of control unit 82 may be distributed within IFCs 88 or a plurality of packet forwarding engines (PFEs) (not shown). Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

Figure 3:
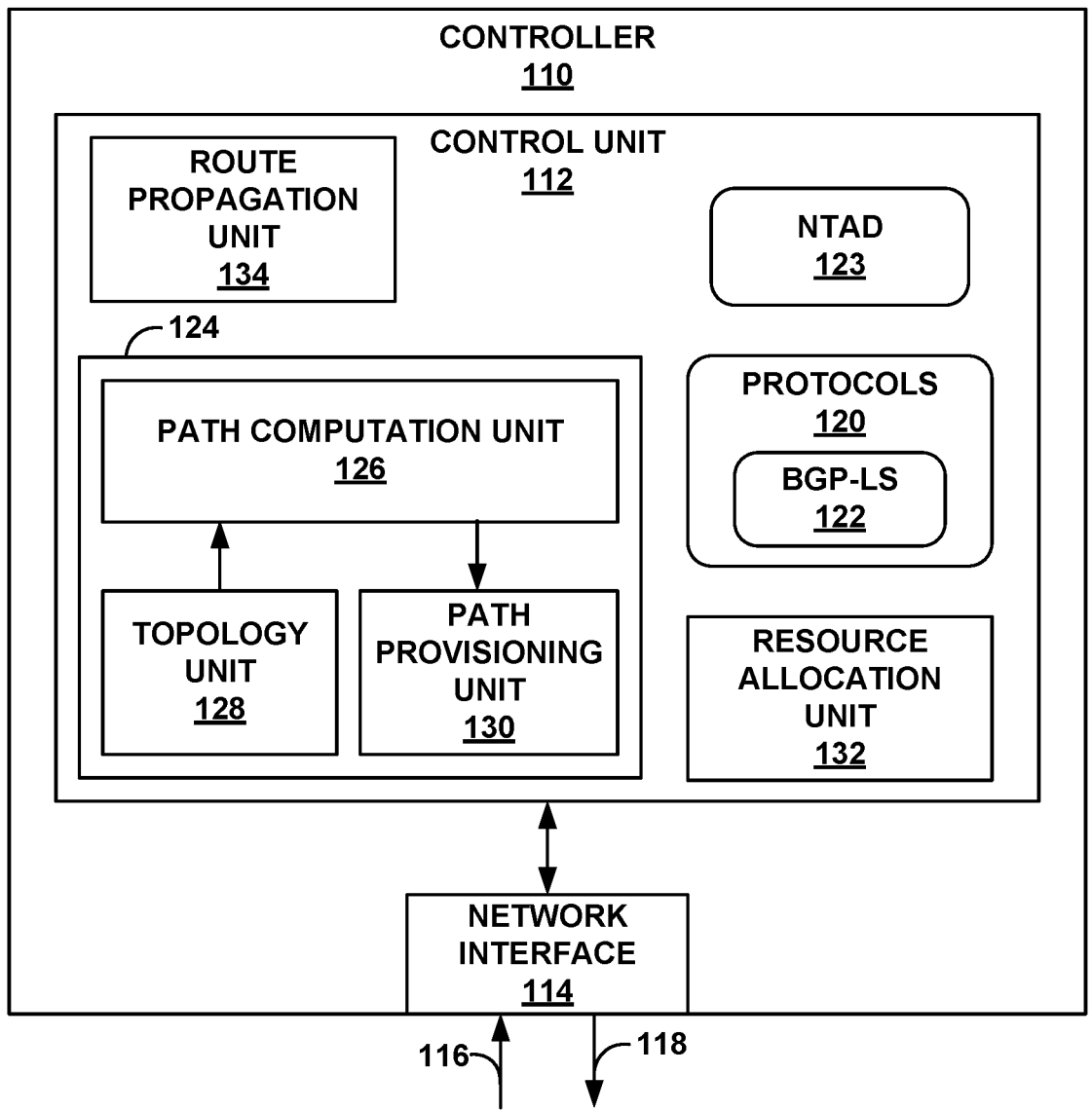
FIG. 3 is a block diagram illustrating an example controller configured to provide propagation of border gateway protocol routing information using route targets specified as bitmasks encoded with link administrative group information, in accordance with the techniques of this disclosure.

FIG. 3 is a block diagram illustrating an example controller configured to provide propagation of border gateway protocol routing information using route targets specified as bitmasks encoded with link administrative group information, in accordance with the techniques of this disclosure. For purposes of illustration, controller device 110 may be described herein within the context of network system 10 of FIG. 1, and may represent controller 11. The architecture of controller device 110 illustrated in FIG. 3 is shown for example purposes only and should not be limited to this architecture. In other examples, controller device 110 may be configured in a variety of ways.

Controller device 110 includes a control unit 112 coupled to a network interface 114 to exchange packets with other network devices by inbound link 116 and outbound link 118. Control unit 112 may include one or more processors (not shown) that execute software instructions, such as those used to define a software or computer program, stored to a computer-readable storage medium (not shown). Alternatively, or additionally, control unit 112 may comprise dedicated hardware for performing the techniques described herein.

Control unit 112 provides an operating environment for path computation element (PCE) 124, network topology abstractor daemon (NTAD) 123, resource allocation unit 132, and route propagation unit 134. In one example, these units may be implemented as one or more processes executing on one or more virtual machines of one or more servers. That is, while generally illustrated and described as executing on a single controller device 110, aspects of these units may be delegated to other computing devices. Control unit 112 also provides an operating environment for several protocols 120, including BGP-LS 122.

Control unit 112 may use BGP-LS 122 to receive link state information from PE routers within a computer network, e.g., underlay topology 14 of WAN 12 from FIG. 1. Control unit 112 may also forward the received link state information to NTAD 123. NTAD 123 may generate a network topology (e.g., underlay topology 14 of WAN 12 from FIG. 1) based on the received link state information.

As illustrated in FIG. 3, PCE 124 includes a path computation unit 126, a topology unit 128, and a path provisioning unit 130. NTAD 123 may forward the topology data to topology unit 128 of PCE 124. Topology unit 128 may receive the topology data describing available resources of the computer network, including access, aggregation, and edge nodes, interfaces thereof, and interconnecting communication links. Path computation unit 126 of PCE 124 may use the topology data received by topology unit 128 to compute paths across the computer network. Upon computing the paths, path computation unit 126 may schedule the paths for provisioning by path provisioning unit 130. A computed path includes path information usable by path provisioning unit 130 to establish the path in the network. For example, path provisioning unit 130 may send the path information to network devices to instruct the network devices to establish at least a portion of the path in the network. Provisioning a path may require path validation prior to committing the path to provide for packet transport.

Control unit 112 includes resource allocation unit 132 configured to allocate one or more subset of the resources (e.g., nodes and/or links) included in the topology data of the computer network to a respective virtual network established over the computer network. For example, NTAD 123 may also forward the topology data to resource allocation unit 132. Resource allocation unit 132 may be configured to allocate the subset of resources to the respective virtual network based on source information, destination information, and classification information for traffic of the respective virtual network. The classification information may comprise link administrative group information, e.g., color or other link attribute, for the traffic.

In accordance with the disclosed techniques, control unit 112 includes a route propagation unit 134 configured to provide propagation of border gateway protocol routes using route targets specified as bitmasks encoded with link administrative group information. For example, NTAD 123 may also forward the topology data to route propagation unit 134 such that route propagation unit 134 may generate a bitmask representing the link administrative group information. For example, controller 110 may generate a bitmask with each bit of the bitmask corresponding to a different administrative group assigned to a link or set of links within a network.

As one example, controller 110 may receive, e.g., from an administrator, instructions to assign link 15A with a first color (e.g., red) and a second color (e.g., blue). In response, route propagation unit 134 generates a bitmask with bits set for each of the colors assigned to link 15A. Control unit 112 may then use BGP-LS 122 to advertise the subset of resources to one or more network devices that are participating in the respective virtual network (e.g., PE routers 16A and 16D of FIG. 1) as a restricted view of the underlay network topology for the respective virtual network. The BGP-LS advertisements may be tagged using route targets to identify the respective virtual network. In accordance with the disclosed techniques, the route targets are specified with the bitmask generated by route propagation unit 134.

Figure 4:
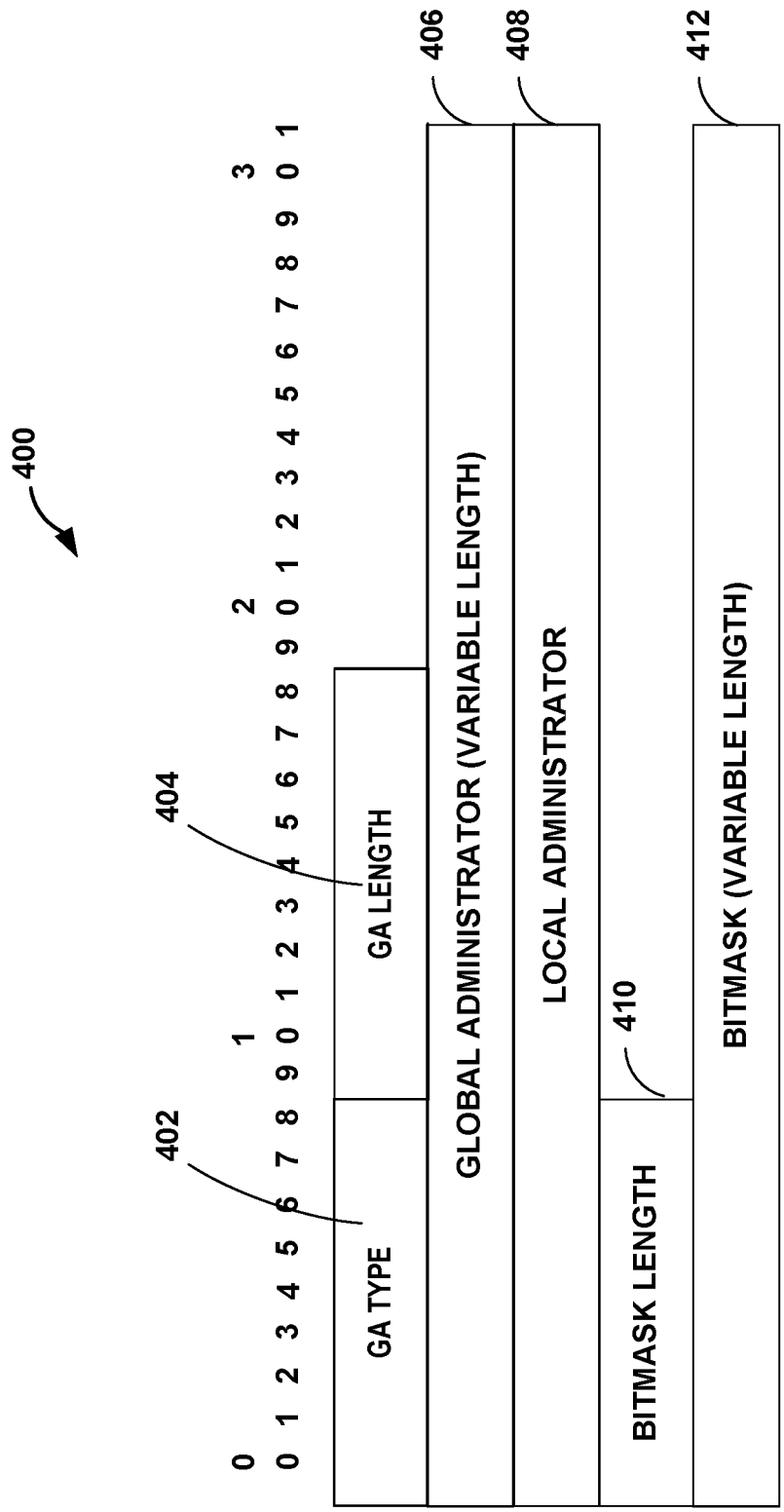
FIG. 4 is a block diagram illustrating an example bitmask route target, in accordance with the techniques of this disclosure.

FIG. 4 is a block diagram illustrating an example bitmask route target, in accordance with the techniques described in this disclosure. In the example of FIG. 4, bitmask route target 400 may represent a transitive BGP community container as described in R. Raszuk, Ed., et al., "Registered Wide BGP Community Values," Internet-Draft, draft-ietf-idr-registered-wide-bgp-communities-02, May 31, 2016, the entire content of which is incorporated by reference herein. The BGP community container may include a global administrator (GA) type 402, a global administrator length 404, a global administrator 406, a local administrator 408, a bitmask length 410, and bitmask 412.

Global administrator type 402 may include an autonomous system number, an IPv4 address or an IPv6 address. For a global administrator type 402 of autonomous system number, the global administrator length 404 may include a length of 4-octets. For a global administrator type 402 of IPv4 address, the global administrator length 404 may include a length of 4-octets. For a global administrator type 402 of IPv6 address, the global administrator length 404 may include a length of 16-octets.

Bitmask 412 may have a variable length defined by bitmask length 410 (e.g., 1-octet bitmask length). As described in this disclosure, bitmask 412 is encoded with link administrative group information. A controller may attach bitmask route target 400 to a BGP-LS advertisement (e.g., BGP update message) and send the BGP-LS advertisement to PE routers participating in a particular virtual network.

Figure 5:
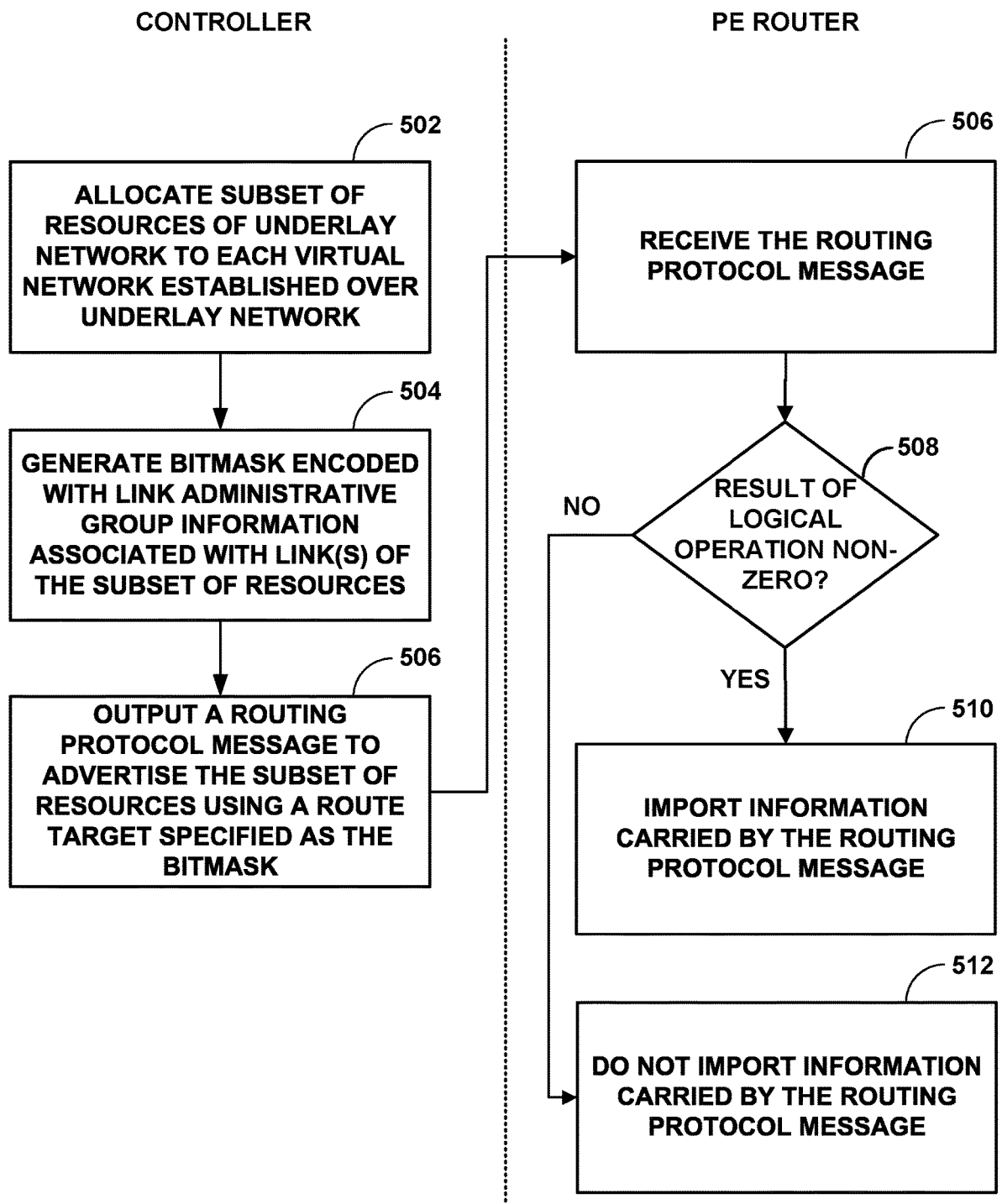
FIG. 5 is a flowchart illustrating an example operation of a controller and a PE router configured to provide propagation and importation of border gateway protocol routing information using route targets specified as bitmasks encoded with link administrative group information, in accordance with one or more example techniques described in this disclosure.

FIG. 5 is a flowchart illustrating an example operation of a controller and a PE router configured to provide importation and propagation of border gateway protocol routing information using route targets specified as bitmasks encoded with link administrative group information, in accordance with the techniques of this disclosure. The operation of FIG. 5 is described with respect to controller 11 and one of PE routers 16 of FIG. 1. In other examples, the operation of FIG. 5 may be performed by controller 110 of FIG. 3 and/or router 80 of FIG. 2.

Controller 11 allocates one or more subset of resources of underlay network topology 14 to each of one or more virtual networks 22 established over underlay network 14 (502). Underlay network 14 may comprise an IP fabric of nodes and links. In some examples, underlay network 14 comprises a WAN that includes one or more autonomous systems. As described above, virtual networks may comprise one or more VPNs or multiple network slices with different performance and scaling properties on top of underlay network 14. The subset of resources allocated to a respective virtual network includes one or more nodes and one or more links of underlay network 14 to be used by the virtual network. In some examples, the subset of resources allocated to the virtual network may be a dedicated subset of resources that are only used to forward traffic of the virtual network. In other examples, the subset of resources allocated to the virtual network may be at least partially shared and used to forward traffic of multiple virtual networks.

Controller 11 may allocate the subset of resources to the virtual network based on constraint information to restrict paths to links with specific affinities or avoid links with specific affinities. A type of constraint may be to compute a path along a subset links associated with a particular color. For example, controller 11 may allocate certain links of underlay network 14 that are used to build routes between pairs of source and destination devices in accordance with a particular color.

After allocating the subset of resources to the virtual network, controller 11 generates a bitmask encoded with link administrative group information associated with the one or more links (504). Each bit of the bitmask may correspond to a different one of a plurality of link administrative groups defined on the network control device. Moreover, each of the link administrative groups may define a different grouping of the subset of resources of the underlay network. For example, link 15A may be associated with a first color (e.g., red) that represents a link with a first link attribute (e.g., low latency). Link 15A may also be associated with a second color (e.g., "blue" color) that represents a link with a second link attribute (e.g., high bandwidth). Controller 11 may set a bit for each of the link administrative groups associated with link 15A. For example, controller 11 may set a first bit of the bitmask (e.g., 0001) to represent the link is associated with the color red and set a second bit of the bitmask (e.g., 0010) to represent the link is associated with the color blue, which results in a bitmask of 0011.

Controller 11 then outputs a routing protocol message to advertise the subset of resources to the plurality of PE routers 16 that is participating in the virtual network (e.g., PE routers 16A and 16D), wherein the routing protocol message includes a route target specified as the bitmask (506). According to the disclosed techniques, controller 11 may advertise the subset of resources to the plurality of PE routers 16 using BGP-LS advertisements including a route target specified as the bitmask.

Each of PE routers 16 may then import or discard the advertisement based on whether the respective PE router is participating in the virtual network, as indicated by the bitmask route target included in the advertisement. For example, PE router 16A, as an example, receives the routing protocol message that advertises the subset of resources of underlay network 14 allocated to the virtual network in which PE router 16A is participating (508). As previously discussed, in order to import the advertisement for the virtual network, PE router 16A may perform a logical 'AND' operation with the route target attached to the routing protocol message and a route target configured on PE router 16A (510). Routers that need to learn the information are configured with one or more bitmask route targets, with the bits set for the link administrative groups that the routers want to import. As one example, PE router 16A may be configured with a route target specified as a bitmask of 0011, which may represent PE router 16A is to import routes for links associated with the colors red (e.g., first bit) and blue (e.g., second bit).

In response to determining that the result of the logical 'AND' operation with the route target attached to the advertisement and the route target configured on PE router 16A is a non-zero value ("YES" of step 510), PE router 16A imports the information carried by the routing protocol message, such as topology information and/or algorithm information (512). Alternatively, in response to determining that the result of the logical 'AND' operation with the route target attached to the advertisement and the route target configured on PE router 16A is zero ("NO" of step 510), PE router 16A does not import the routing protocol message (514).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network control device comprising:
   a network interface; and
   one or more processors configured to:
      allocate one or more subset of resources of an underlay network to each of one or more virtual networks established over the underlay network, wherein the one or more subset of resources allocated to a respective virtual network of the one or more virtual networks includes one or more nodes and one or more links of the underlay network to be used by the respective virtual network;
      generate a route target specified as a bitmask encoded with information indicating a plurality of link administrative groups that specify a plurality of link attributes associated with the one or more links, wherein each bit of the bitmask corresponds to a different link administrative group of the plurality of link administrative groups, and wherein each of the link administrative groups specifies a particular link attribute of the plurality of link attributes associated with the one or more links and defines a different grouping of the one or more subset of resources of the underlay network; and
      output, to a plurality of provider edge (PE) routers that are participating in the respective virtual network, a routing protocol message to advertise the one or more subset of resources, wherein the routing protocol message includes the route target specified as the bitmask to cause the plurality of PE routers that are participating in the respective virtual network to import information carried by the routing protocol message.

2. The network control device of claim 1, wherein the one or more processors are configured to output the routing protocol message to advertise the one or more subset of resources using Border Gateway Protocol-Link State (BGP-LS) advertisements.

3. The network control device of claim 2, wherein the one or more processors are configured to output the routing protocol message to advertise a flexible-algorithm definition for the one or more subset of resources, wherein the flexible-algorithm definition is specified as network layer reachability information (NLRI) of the BGP-LS advertisements, wherein the flexible-algorithm definition includes a calculation-type, metric-type, and constraint.

4. The network control device of claim 1, wherein the particular link attribute comprises a particular color associated with the one or more links.

5. The network control device of claim 1,
   wherein the one or more virtual networks comprise one or more network slices on top of the underlay network,
   wherein each of the one or more networks slices is configured with different performance and scaling properties; and
   wherein the routing protocol message advertises the one or more subset of resources for the one or more network slices.

6. A method comprising:
   allocating, by a network control device, one or more subset of resources of an underlay network to each of one or more virtual networks established over the underlay network, wherein the one or more subset of resources allocated to a respective virtual network of the one or more virtual networks includes one or more nodes and one or more links of the underlay network to be used by the respective virtual network;
   generating, by the network control device, a route target specified as a bitmask encoded with information of a plurality of link administrative groups that specify a plurality of link attributes associated with the one or more links, wherein each bit of the bitmask corresponds to a different link administrative group of the plurality of link administrative groups, and wherein each of the link administrative groups specifies a particular link attribute of the plurality of link attributes associated with the one or more links and defines a different grouping of the one or more subset of resources of the underlay network; and
   outputting, by the network control device and to a plurality of provider edge (PE) routers that are participating in the respective virtual network, a routing protocol message to advertise the one or more subset of resources, wherein the routing protocol message includes the route target specified as the bitmask to cause the plurality of PE routers that are participating in the respective virtual network to import information carried by the routing protocol message.

7. The method of claim 6, wherein outputting the routing protocol message to output the routing protocol message to advertise the one or more subset of resources comprises outputting the routing protocol message to advertise the one or more subset of resources using Border Gateway Protocol-Link State (BGP-LS) advertisements.

8. The method of claim 7, wherein outputting the routing protocol message to advertise the one or more subset of resources further comprises outputting the routing protocol message to advertise a flexible-algorithm definition for the one or more subset of resources, wherein the flexible-algorithm definition is specified as network layer reachability information (NLRI) of the BGP-LS advertisements, wherein the flexible-algorithm definition includes a calculation-type, metric-type, and constraint.

9. The method of claim 6, wherein the particular link attribute comprises a particular color associated with the one or more links.

10. The method of claim 6, further comprising:
   receiving, by a respective PE router participating in the respective virtual network, a routing protocol message that advertises one or more subset of resources of an underlay network allocated to a virtual network in which the router is participating,
      wherein the one or more subset of resources allocated to a respective virtual network includes one or more nodes and one or more links of the underlay network to be used by the virtual network, and wherein the routing protocol message is attached to a route target specified as a bitmask encoded with link administrative group information of the one or more links; and determining, based on the bitmask, whether to import information carried by the routing protocol message.

11. The method of claim 10, wherein the route target comprises a first route target attached to the routing protocol message, wherein the bitmask comprises a first bitmask, wherein the first route target is specified as the first bitmask, and wherein determining whether to import information carried by the routing protocol message further comprises:

performing, by the respective PE router, a logical AND operation with the first bitmask and a second bitmask, wherein the router is configured with a second route target specified as the second bitmask; and based on determining that a result of the logical AND operation is a non-zero value, importing, by the respective PE router, information carried by the routing protocol message.

12. The method of claim 10, wherein the route target comprises a first route target attached to the routing protocol message, wherein the first routing target is specified as a first bitmask, wherein the first route target is specified as the first bitmask, and wherein determining whether to import information carried by the routing protocol message further comprises:

perform a logical AND operation with the first bitmask and a second bitmask, wherein the router is configured with a second route target specified as the second bitmask; and based on determining that a result of the logical AND operation with the first route target attached to the routing protocol message and the second route target configured on the router is zero, not importing, by the respective PE router, the information carried by the routing protocol message.

13. Non-transitory computer readable media including instructions that, when executed, cause processing circuitry to:

allocate one or more subset of resources of an underlay network to each of one or more virtual networks established over the underlay network, wherein the one or more subset of resources allocated to a respective virtual network of the one or more virtual networks includes one or more nodes and one or more links of the underlay network to be used by the respective virtual network;

generate a route target specified as a bitmask encoded with information of a plurality of link administrative groups that specify a plurality of link attributes associated with the one or more links, wherein each bit of the bitmask corresponds to a different of the plurality of link administrative groups, and wherein each of the link administrative groups specifies a particular link attribute of the plurality of link attributes associated with the one or more links and defines a different grouping of the one or more subset of resources of the underlay network; and output, to a plurality of provider edge (PE) routers that are participating in the respective virtual network, a routing protocol message to advertise the one or more subset of resources, wherein the routing protocol message includes a route target specified as the bitmask.

14. The non-transitory computer-readable media of claim 13, wherein the processing circuitry is configured to output the routing protocol message to advertise the one or more subset of resources using Border Gateway Protocol-Link State (BGP-LS) advertisements.

15. The non-transitory computer-readable media of claim 14, wherein the processing circuitry is configured to output the routing protocol message to advertise a flexible-algorithm definition for the one or more subset of resources, wherein the flexible-algorithm definition is specified as network layer reachability information (NLRI) of the BGP-LS advertisements, wherein the flexible-algorithm definition includes a calculation-type, metric-type, and constraint.

16. The non-transitory computer-readable media of claim 13, wherein the particular link attribute comprises a particular color associated with the one or more links.

17. The non-transitory computer-readable media of claim 13, wherein the one or more virtual networks comprise one or more network slices on top of the underlay network, wherein each of the one or more networks slices is configured with different performance and scaling properties; and wherein the routing protocol message advertises the one or more subset of resources for the one or more network slices.

\* \* \* \* \*